United States Patent [19]  [11] 3,839,324
Schultze et al.  [45] Oct. 1, 1974

[54] PROCESS FOR THE PURIFICATION OF CAPROLACTAM

[75] Inventors: Hans Joachim Schultze, Chur/Gr; Ruthild Henn, Domat-Ems/Gr; Clau Berther, Chur/Gr, all of Switzerland

[73] Assignee: Inventa AG fur Forschung und Patentverwertung, Zurich, Switzerland

[22] Filed: Dec. 7, 1971

[21] Appl. No.: 205,566

[30] Foreign Application Priority Data
Dec. 22, 1970  Switzerland............ 18932/70

[52] U.S. Cl............................. 260/239.3 A
[51] Int. Cl............................. C07d 41/06
[58] Field of Search................. 260/239.3 A

[56] References Cited
UNITED STATES PATENTS

| | | | |
|---|---|---|---|
| 2,221,369 | 11/1940 | Cass | 260/239.3 A |
| 2,313,026 | 3/1943 | Schlack | 260/239.3 A |
| 2,752,336 | 6/1956 | Boon | 260/239.3 A |
| 2,818,858 | 11/1957 | Joris | 260/239.3 A |
| 3,145,198 | 8/1964 | Mordidelli et al. | 260/239.3 A |
| 3,359,260 | 12/1967 | Roberts et al. | 260/239.3 A |
| 3,428,625 | 2/1969 | Strauss | 260/239.3 A |
| 3,476,744 | 11/1969 | Berther et al. | 260/239.3 A |

*Primary Examiner*—Henry R. Jiles
*Assistant Examiner*—Robert T. Bond
*Attorney, Agent, or Firm*—Bierman & Bierman

[57] ABSTRACT

A continuous process for the purification of caprolactam characterized in that raw caprolactam is subjected to a solvent distillation followed by a distillation under reduced pressure in the presence of sodium hydroxide and then to a melt crystallization, in which:

a. The residue from the alkaline distillation is taken up in water, the aqueous solution extracted with benzene or toluene and the lactam solution fed to the main product stream through the solvent distillation;

b. The residue from the melt crystallization is extracted in the crystalline state with an aliphatic or cycloaliphatic hydrocarbon with 5–10 carbon atoms and the purified residue is fed back into the alkaline distillation of the main produce stream; and c. The aliphatic or cycloaliphatic hydrocarbon is regenerated and used again for the extraction of the residue from the melt-crystallization.

27 Claims, 1 Drawing Figure

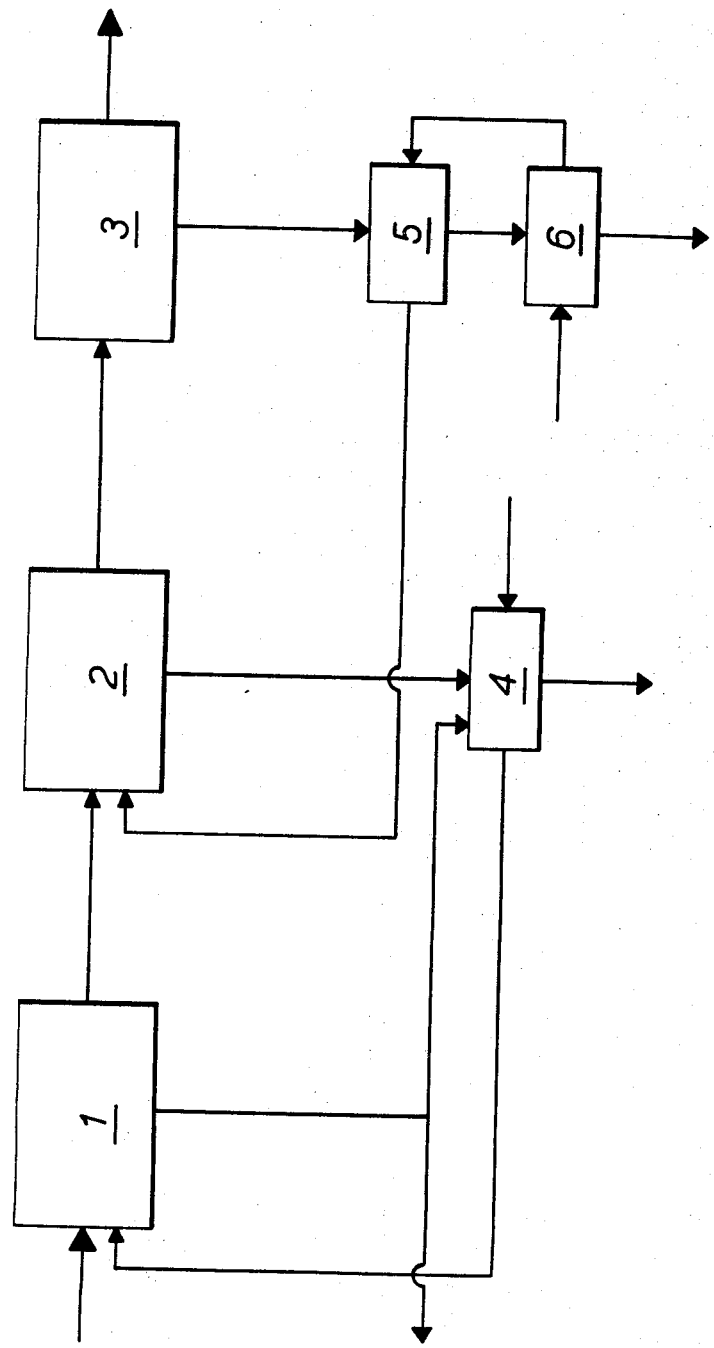

PROCESS FOR THE PURIFICATION OF CAPROLACTAM

The present invention concerns a continuous process for the purification of caprolactam.

The purification of caprolactam in order to achieve the high degree of purity demanded by users by one of the procedures in commercial use at present is an expensive process, frequently divided into a number of purifying operations. These are usually partly chemical and partly physical in character. Physical purification methods which lead continuously to a highly purified product without requiring essential auxiliary agents are preferred. An example of the method is the melt crystallization method described in Swiss Pat. Specification No. 450,433.

In such and similar purifying methods a caprolactam, pre-purified by simple distillation, is converted to pure caprolactam with yields up to 97 percent, usually 90–95 percent. The remaining approximately 5–10 percent is so impure that hitherto all conventional methods for working this residue were either impossible, or the expense of purification of this product was unbearably high. Since 3 to 10 percent is a considerable quantity, the purification of that residue is of great economical interest in the manufacture of caprolactam.

In Swiss Pat. application No. 14550/70, now Swiss Pat. No. 547,805, a process for the purification of lactams, particularly caprolactam, by extraction of the lactam in the solid state with an aliphatic or cycloaliphatic hydrocarbon which exhibits little or no solvent power for lactam is described. Cyclohexane is a preferred solvent in that process. The effectiveness of this extractive purification, hereinafter called crystal extraction, is based on the selective solubility of impurities which are more or less similar to the lactam, particularly open chain amides and C-methyl-lactams, in cyclohexane or other suitable hydrocarbons.

In addition, there is an outstanding selectivity in solvent power for colorless impurities which even in parts per million quantities strongly affect the transparency in the ultraviolet range at 290 to 310 mm. Such impurities produce inter alia rapid yellowing of the lactam and the polyamide which can be produced therefrom. They are not or are only partially identical with the colored impurities which also remain in the lactam after the extraction and are essentially responsible for the color index of the product, the APHA-number. These colored substances are best removed by distillation.

The purifying effect is particularly apparent if the extractive purification of the lactam crystals, which is preferably effected at about 20°C starting from flaked or molten lactam, is combined with a subsequent vacuum distillation of the extracted material over sodium hydroxide.

The fact, that in this connection the distillation has only a comparatively subordinate importance, is apparent because the raw lactam or lactam residue which is enriched in impurities cannot, by distillation over sodium hydroxide, be brought to a state of purity which is comparable with that using an additional extraction, e.g. with cyclohexane. This appears clearly from the following comparative table:

| Analysis | Caprolactam | | |
|---|---|---|---|
| | untreated | distilled | extracted and distilled |
| Permanganate number | 100 | 4300 | 18000 |
| Volatile bases | 1.3 | 0.75 | 0.13 |
| Transparency % | % | % | % |
| U.V. 290 nm | 0 | 34.5 | 86.0 |
| U.V. 310 nm | 5 | 65.0 | 94.5 |

The 3 – 10 percent residual lactam which is obtained from a melt crystallization of caprolactam normally shows e.g. permanganate numbers of 0–1,000, volatile bases of at least 1.0, and transparencies in the ultraviolet range of 290 to 310 nm of less than 10 percent.

A process has now been found which makes it possible to combine the working up of these very impure lactam residual fractions so that an economical, technically simple, and continuous recovery of these lactam residual fractions is secured in the main purification process. The purity of the worked-up lactam residual fraction must be of at least the same quality as that of the main stream. If this were not the case, it would lead in the course of time to deterioration of quality in the end product.

The melt crystallization mentioned normally precedes a simple distillation which on technical grounds is associated with a distillation residue of about 5 percent. This residue must also, in the interest of economy, be further worked up and integrated in the whole purification process.

The subject of the present invention is thus a process for the purification of caprolactam in which in the first stage, a raw lactam (obtained, e.g., by neutralization of mixtures of caprolactam and sulphuric or phosphoric acid and subsequent extraction, as a residue from a preceding purification stage, or by one of the customary other procedures) is subjected to a solvent distillation (FIG. 1, stage 1), and thereafter to simple distillation under reduced pressure (FIG. 1, stage 2) wherein the distillate forms the starting material for the succeeding melt crystallization stage (FIG. 1, stage 3). The residue from the distillation under reduced pressure and the residue from the melt crystallization are worked up together, or preferably separately (FIG. 1, stages 4 and 5), and returned to the main stream.

The subject of the present invention is in particular the combination of the above main process with the working up of the residue from the distillation stage (FIG. 1, stage 2) by extraction (FIG. 1, stage 4) of its aqueous solution with a water-insoluble solvent, followed by the working up of the very impure residue coming from the melt crystallization by means of extraction in the crystalline state (FIG. 1, stage 5) with a second solvent, regeneration of this solvent, e.g., by simple washing with water (FIG. 1, stage 6), and integration of these three stages in the main process.

The carrying out of the solvent distillation (FIG. 1, stage 1), the distillation of the extract lactam or other raw lactam (FIG. 1, stage 2), and the melt crystallization (FIG. 1, stage 3) take place in known ways.

The product obtained as a residue from the distillation in the presence of sodium hydroxide (FIG. 1, stage 2), preferably of 0.05–0.5 percent by weight, amounts according to the type of distillation apparatus to 3 – 10 percent of the original product. It contains, besides residual caprolactam, the sodium hydroxide introduced before the distillation (2-4 percent by weight) as such, or in the form of organic sodium compounds, together with aminocaproic acid and oligomeric compounds. Readily volatile components besides lactam are only present in small quantities. The degree of impurity of this product is so high that normal methods of analysis cannot be carried out or yield meaningless results.

It has now been established that from this residual product of the distillation, e.g., in the form of a 20–80 percent, preferably 50–60 percent aqueous solution, by continuous simple extraction with toluene or benzene at 20°–75°c, preferably 50°–60°c, up to 95 percent of the caprolactam contained in the residue can be recovered, and that this lactam is comparable in purity or even better than an extract lactam before the distillation. The toluene or benzene solution of the extracted lactam can therefore be treated by solvent distillation (FIG. 1, stage 1), and the lactam thus obtained be fed into the main product stream. Thus there exists for lactam distillation a nearly quantitative yield, whilst the impurities leave the circuit in the form of an aqueous solution.

The raw lactam coming from the alkaline distillation (FIG. 1, stage 2) is subjected to melt crystallization (FIG. 1, stage 3) in which, according to the temperature of the flakes and the melt, 10 – 50 parts by weight of the lactam to be purified are introduced under practically adiabatic conditions, e.g., in the form of flakss into a melt of 90 – 50 parts by weight of the same lactam. In particular, e.g., 70–80 percent of the quantity of lactam to be purified may be melted, the residual 30–20 percent of the lactam added at room temperature, and the lactam crystals obtained be separated from the melt.

The preferred form of execution is the single two-stage crystallization with a total recovery of pure lactam of 90–95 percent in one treatment, calculated on product input to the melt crystallization. According to this procedure, 5–10 percent lactam remains as a residue enriched in impurities.

The working up of this impure product takes place by crystal extraction (FIG. 1, stage 5) with an aliphatic or cycloaliphatic hydrocarbon with 5 – 10 carbon atoms, like, e.g., n- or i- hexane and its straight chain or branched chain homologues, methyl or higher alkylated cyclohexane, decalin and petroleum ether having a boiling point of 110°–140°C. The advantage of petroleum ether is that it is cheap and has a low solvent power for caprolactam (0.8 g of caprolactam dissolved at 20°C in 100 ml of petroleum ether (b.p. 110°–140°C). Preferably cyclohexane is used, which is used as starting material in many caprolactam processes, and which is therefore already available. For the crystallization the lactam present in the melt or as a powder together with the cyclohexane is continuously introduced into a stirring vessel. The temperature in this vessel can be maintained at 10°–45°C, preferably 15°–25°C, and the mixture retained for 5–60 minutes, preferably 15–30 minutes. In the mixture small lactam crystals form which may readily be separated from the solvent by centrifuging or filtration. By reason of the small solubility of caprolactam in cyclohexane at room temperature (0.85 g of caprolactam in 100 ml of solution at 10°C, or 1.38 g in 100 ml at 20°C), the ratio of lactam:cyclohexane (weight:volume) may be between 1 : 1 and 1 : 5, preferably from 1 : 1.5 to 1 : 2.5. The ratio depends on the purity of the lactam, the admissible lactam loss, and on the kind and manner of the separation of the crystalline lactam from the solvent after the extraction. This latter is preferably effected by centrifuging, since in a continuous operation an essentially lower residual solvent content is obtained than by filtration.

With the use of petroleum ether for the crystal extraction, substantially the same conditions hold for temperature, extraction times and quantitative ratio as with the use of cyclohexane.

The lactam loss in the extraction is conditioned by the solubility in the solvent independent of the lactam/solvent ratio and of the temperature in the extraction. With the preferred conditions, it amounts to 2–5 percent calculated on the quantity used in the extraction.

The lactam purified by crystal extraction and damp with solvent is preferably vaporized by treatment with steam, and thus simultaneously freed from solvent residues. It is then, in the form of this melt containing water, fed back to the distillation (FIG. 1, stage 2). The purification effect of the crystal extraction is such that in a continuous operation no enrichment in impurities takes place, and hence there is no gradual fall in the quality of the pure lactam.

By the return of the melt crystallization residue worked up by crystal extration a yield of about 99% is obtained in this stage of the lactam purification.

The regeneration of the solvent used for the crystal extraction may take place by distillation. Surprisingly, however, it has been found that the regeneration can be effected essentially more simply and cheaply by subjecting the solvent to simple water washing (FIG. 1, stage 6).

This takes place in the case of cyclohexane which is preferably used, in a volume ratio of 1 : 0.1 to 1 : 3, preferably 1 : 0.25 to 1 : 0.5 cyclohexane : water The temperature during the water washing is 10°–60°C; the effect is however surprisingly strongest at 10°–20°C. The contact time of the water with the cyclohexane is between 0.5 to 30 minutes, preferably however only 1 – 2 minutes. The regeneration may thus take place continuously in a small stirring vessel, the separation of the organic and water phases in a small settling vessel. The cyclohexane coming from the regeneration can, without further treatment, be returned to the crystal extraction stage (FIG. 1, stage 5). The impurities taken up during the crystal extraction of the cyclohexane, as well as the small quantity of lactam corresponding to the solubility of the lactam, leave the purification process in the form of an aqueous solution.

The excellent effect of the water washing of the cyclohexane is all the more surprising, since cyclohexane has a high selective solvent power for the impurities in the lactam. It was therefore not to be foreseen that even at normal temperature and very short contact times a strongly selective extracting action of water would exist.

With the aid of the process according to the invention it is possible in a continuous operation starting from an extract or other raw lactam, with yields of 98–99 percent calculated on the extract or raw lactam, to produce a pure lactam with the following analysis values:

| Analysis | Raw Lactam | Pure Lactam |
|---|---|---|
| Permanganate number | 200 | 16.00 |
| Volatile bases | 0.34 | 0.03–0.05 |
| APHA/Melt | 75 | 4–10 |
| Transparency: | % | % |
| UV 290 nm | 24 | 94 |
| UV 310 nm | 49 | 97 |

The attainment of such a high quality with almost quantitative yield with the use of purely physical means alone has hitherto been impossible. Highest quality with near quantitative yield has hitherto always been associated with the addition of chemical adjuvants.

For the process according to the invention, active carbon, ion exchange resins, or other chemical substances are not necessary for the working up and purification of the main or subsidiary streams of product. As auxiliary agents, apart from the sodium hydroxide generally used in the distillation, toluene or benzene and cyclohexane or another of the above mentioned hydrocarbons with 5–10 carbon atoms only are used as solvents for the extraction of the residues. These solvents are however already used in another way in the process for the production of lactams, or they are so cheap so that they form no additional burden.

It is thus manifest that the process of the invention yields, from the technological viewpoint, an essential simplicity because the use of chemical auxiliary agents involves typical disadvantages in a continuous process on account of their utilization or the need for their activation or regeneration.

The continuous process for the purification of caprolactam according to the present invention is thus characterized in that raw caprolactam is subjected to a solvent distillation, followed by a distillation under reduced pressure in the presence of sodium hydroxide and then to a melt crystallization, in which:

a. The residue from the alkaline distillation is taken up in water, the aqueous solution extracted with benzene or toluene and the lactam solution fed to the main product stream through the solvent distillation, b. The residue from the melt crystallization is extracted in the crystalline state with an aliphatic or cycloaliphatic hydrocarbon with 5-10 carbon atoms and the purified residue is fed back into the alkaline distillation of the main product stream, and c. The aliphatic or cycloaliphatic hydrocarbon is regenerated and used again for the extraction of the residue from the melt-crystallization.

The following examples will explain more closely the essence of the present invention without limiting it in any way.

EXAMPLE 1

From a device (FIG. 1, stage 1) for the removal of benzene or toluene by solvent distillation, 5,545 kg of raw caprolactam is obtained per hour in the form of a melt containing about 10 percent of water. This quantity mixes with 5,000 kg of fresh product entering the purification process, and with 301 and 244 kg of product resulting from the working up of residues (FIG. 1, stages 4 and 5). With the addition of 9 kg of sodium hydroxide per hour, this is first subjected to removal of water, and finally distilled without fractionation at 4–8 torr in the lactam distillation (FIG. 1, stage 2). The first running of 24 kg per hour is rejected with the water, the following low boiling fraction containing only a little water and the distillation residue, totally 328 kg, are fed to the working-up stage (FIG. 1, stage 4). As the distillate, 5,183 kg of caprolactam is obtained corresponding to 93.9 percent of the product treated distillation.

Before and after distillation, the product has the following analytical values:

| | Permanganate Number | Volatile Bases | APHA Melt | Ultraviolet 290/310 nm |
|---|---|---|---|---|
| Before distillation | 200 | 0.25 | 75 | 24/49% |
| After distillation | 2,500 | 0.16 | 10–20 | 55/80% |

The distillation fore-runnings containing 338 kg of caprolactam, and the residual product in which the whole quantity of sodium hydroxide and polymerization and decomposition products are present is extracted with benzene in the form of a mixture containing 50 percent water. The quantitative ratio aqueous solution : benzene amounts to 1 : 3, the contact time 20 minutes, and the extraction temperature 50°C. The resulting benzene solution which contains 301 kg of caprolactam with a little water is recycled to the solvent distillation stage (FIG. 1, stage 1). The analysis of the solvent-free extract is:

Permanganate number: 350, volatile bases: 0.16, APHA (melt): >75.

37 kg of lactam and the impurities are rejected with the aqueous phase.

The 5,183 kg of lactam coming from the distillation stage (FIG. 1, stage 2) is fed to the two-stage melt crystallization (FIG. 1, stage 3), and there divided into an hourly output of 4,925 kg of pure lactam, corresponding to 98.5 percent based on the fresh product in the solvent distillation, and 258 kg of very impure motor liquor (melt). The analysis gives:

| | Permanganate number | Volatile bases | 21 APHA melt | Ultraviolet 290/310 nm |
|---|---|---|---|---|
| Pure lactam | > 16000 | 0.04 | 5 | 94.5/97/5% |
| Mother liquor | < 300 | > 1.3 | >100 | 0/0% |

The 258 kg of mother liquor produced hourly is continuously introduced at a temperature of 75°C and whilst cooling together with 520 l of cyclohexane into a stirring vessel in such a way that the temperature of the crystal slurry which forms is 20°C and a retention time of 25–30 minutes is ensured. Corresponding to the quantity fed in, an equivalent portion of the slurry is withdrawn and separated in a decanting centrifuge into lactam crystals and the cyclohexane containing impurities. 244 kg of lactam, corresponding to 94.6 percent, calculated on the crystallization mother liquor is obtained which is freed from the residual cyclohexane by treatment with steam, and is recycled to the lactam distillation stage (FIG. 1, stage 2) in the form of a melt containing about 10 percent of water. The analysis is:

Permanganate number: 550, volatile bases: 0.45, APHA (melt): >50, ultraviolet: 290/310 nm 37/47 percent.

The cyclohexane solution coming from the crystal extraction in which 12 kg of lactam is present together with impurities in the lactam is, for regeneration of the cyclohexane, treated in a mixing vessel, provided for a through flow, with 150 l of water at 15°C. The contact time amounts to 5 minutes. After this there follows phase separation in a settling vessel and recycling of the cyclohexane to the crystal extraction. The water, which now contains the impurities and 12 kg of lactam in solution, is rejected.

EXAMPLE 2

The 258 kg of mother liquor formed per hour in accordance with Example 1, are introduced in molten form under conditions completely analogous with those of that example, hourly with 520 l of petroleum ether (boiling point 110°–140°C) into a coolable stirring vessel. The crystal slurry which forms is separated into lactam crystals and a petroleum ether mother liquor, in the same way as when using cyclohexane as the solvent, with the aid of a decanting centrifuge. By reason of the small solubility of the lactam in petroleum ether, after removal of the residual petroleum ether adhering to the crystals, 248 kg of worked up lactam is obtained, corresponding to 96.2 percent calculated on the originally used crystallization mother liquor and which is again recycled to the lactam distillation (FIG. 1, stage 2) in the form of a melt containing about 10 percent of water.

This lactam has, before the distillation, the following analysis values:
Permanganate number: 600, volatile bases: 0.33, APHA (melt): 50, ultraviolet transparency at: 290/310 nm 25–40 percent.

The working up of the petroleum ether solution flowing from the decantation centrifuge, in which are present per hour 8 kg of lactam, takes place again in an analogous manner, as with the use of cyclohexane, by reextraction with water. The regenerated petroleum ether is recycled to the process, the aqueous solution of impurities and lactam is rejected.

What is claimed is:

1. In a process for the purification of caprolactam; wherein raw caprolactam, which is obtained by neutralization and subsequent extraction of a caprolactam/sulfuric acid or caprolactam/phosphoric acid mixture, is subjected to a solvent distillation, then to an alkaline distillation in vacuo whereby a first residue is produced, then to melt crystallization whereby a second residue is produced and then purified caprolactam is recovered; the improvement which comprises the steps of dissolving the first residue in water to produce an aqueous solution of the first residue; extracting the aqueous solution of the first residue with a water insoluble solvent for the caprolactam to produce a solution of caprolactam in said solvent; recycling the solution of caprolactam in said solvent to the solvent distillation step; extracting the second residue with an aliphatic or cycloaliphatic hydrocarbon having 5–10 carbon atoms to produce a purified residue and a solution of impurities in said aliphatic or cycloaliphatic hydrocarbon; recycling the purified residue to the alkaline distillation step; and recovering said aliphatic or cycloaliphatic hydrocarbon from the solution of said aliphatic or cycloaliphatic hydrocarbon and recycling it to the step of extracting the second residue.

2. The process as recited in claim claim 1 wherein the raw caprolactam is obtained by neutralization and subsequent extraction of a caprolactam/sulfuric acid or caprolactam/phosphoric acid mixture.

3. The process as recited in claim 2 wherein the alkaline distillation is carried out in the presence of sodium hydroxide.

4. The process as recited in claim 3 wherein the sodium hydroxide is present as 0.05–0.5 percent by weight.

5. The process as recited in claim 1 wherein the alkaline distillation is carried out at reduced pressure.

6. The process as recited in claim 1 wherein the aqueous solution of the first residue is a 20–80 percent solution.

7. The process as recited in claim 1 wherein the aqueous solution of the first residue is a 50–60 percent solution.

8. The process as recited in claim 1 wherein the extraction of the aqueous solution of the first residue is carried out at about 20°–75°C.

9. The process as recited in claim 1 wherein the extraction of the aqueous solution of the first residue is carried out at 50°–60°C.

10. The process as recited in claim 1 wherein in the melt crystallization step 10–50 parts by weight of the caprolactam to be purified are introduced as flakes into a melt of 50–90 parts by weight of caprolactam.

11. The process as recited in claim 10 wherein 20–30 parts by weight of the caprolactam to be purified are introduced into a melt of 70–80 parts by weight of caprolactam.

12. The process as recited in claim 1 wherein the second residue is extracted with cyclohexane or petroleum ether.

13. The process as recited in claim 1 wherein the second residue is extracted at about 10°–45°C for about 5–60 minutes.

14. The process as recited in claim 13 wherein the second residue is extracted at 10°–15°C.

15. The process as recited in claim 13 wherein the second residue is extracted for 15–30 minutes.

16. The process as recited in claim 12 wherein the ratio of caprolactam to the cyclohexane or petroleum ether is 1:1 to 1:5, said ratio being in parts by weight : parts by volume.

17. The process as recited in claim 16 wherein the ratio is 1:1.5 to 1:2.5.

18. The process as recited in claim 12 wherein the cyclohexane or petroleum ether is washed with water in a volume ratio of 1:0.1 to 1:3.

19. The process as recited in claim 18 wherein the ratio is 1:0.25 to 1:0.5.

20. The process as recited in claim 18 wherein the washing is carried out at about 10°–60°C.

21. The process as recited in claim 18 wherein the washing is carried out at 10°–20°C.

22. The process as recited in claim 18 wherein the washing is carried out for about 0.5 – 30 minutes.

23. The process as recited in claim 18 wherein the washing is carried out for 1 – 2 minutes.

24. The process as recited in claim 1 wherein said water soluble solvent for caprolactam is benzene or toluene.

25. The process as recited in claim 1 wherein the aliphatic or cycloaliphatic hydrocarbon is recovered by washing with water in a volume ratio of 1:0.1 to 1:3 at a temperature of 10°–60°C. for about 0.5–30 minutes.

26. The process as recited in claim 25 wherein the washing is carried out for 1–2 minutes.

27. The process as recited in claim 25 wherein the washing is carried out at a temperature of 10°–20°C.

* * * * *